United States Patent
Johnson

(10) Patent No.: US 9,550,283 B2
(45) Date of Patent: Jan. 24, 2017

(54) POWER TOOL WITH SPINDLE LOCK

(71) Applicant: Ingersoll-Rand Company, Davidson, NC (US)

(72) Inventor: Joshua Odell Johnson, Allentown, PA (US)

(73) Assignee: Ingersoll-Rand Company, Davidson, NC (US)

( * ) Notice: Subject to any disclaimer, the term of this patent is extended or adjusted under 35 U.S.C. 154(b) by 833 days.

(21) Appl. No.: 13/749,553

(22) Filed: Jan. 24, 2013

(65) Prior Publication Data

US 2014/0202725 A1 Jul. 24, 2014

(51) Int. Cl.

| B25B 21/02 | (2006.01) |
|---|---|
| B25D 11/00 | (2006.01) |
| B25D 9/00 | (2006.01) |
| B25F 5/00 | (2006.01) |
| B23B 31/12 | (2006.01) |
| B25B 21/00 | (2006.01) |
| B23B 45/00 | (2006.01) |

(52) U.S. Cl.
CPC ............. *B25B 21/02* (2013.01); *B23B 31/123* (2013.01); *B25B 21/00* (2013.01); *B25D 9/00* (2013.01); *B25D 11/00* (2013.01); *B25F 5/00* (2013.01); *B25F 5/001* (2013.01); *B23B 45/008* (2013.01)

(58) Field of Classification Search
CPC .... B23B 21/00; B23B 23/0064; B23B 31/123; B23B 45/008; B25F 5/001; B25B 21/00; B25B 23/0064
USPC ... 173/1, 29, 216, 217, 93, 93.5, 176; 81/54, 81/57.14, 60; 279/62, 902
See application file for complete search history.

(56) References Cited

U.S. PATENT DOCUMENTS

| 4,400,995 A | * | 8/1983 | Palm | .................... B23B 45/008 173/164 |
|---|---|---|---|---|
| 4,754,669 A | * | 7/1988 | Verdier | ................... B25B 21/00 81/57.14 |
| 4,804,048 A | | 2/1989 | Porth, Jr. | |

(Continued)

FOREIGN PATENT DOCUMENTS

EP     0118215 B1    5/1989

OTHER PUBLICATIONS

Ingersoll Rand, "2015MAX and 2025MAX Series Angle Air Impactool," Nov. 2010, pp. 1-2.

(Continued)

*Primary Examiner* — Scott A. Smith
(74) *Attorney, Agent, or Firm* — Barnes & Thornburg LLP

(57) ABSTRACT

Illustrative embodiments of power tools with spindle locks are disclosed. In one illustrative embodiment, a power tool may include a drive train including an output assembly, the output assembly including a spindle configured to support a tool element, a power source configured to selectively supply energy to the drive train to cause the output assembly including the spindle to rotate, a switch movable between a first position in which the power source does not supply energy to the drive train and a second position in which the power source supplies energy to the drive train, and a spindle lock configured to automatically engage the output assembly including the spindle when the switch is in the first position and to automatically disengage the output assembly including the spindle when the switch is in the second position, the spindle lock preventing rotation of the output assembly including the spindle when engaged.

4 Claims, 7 Drawing Sheets

(56) References Cited

U.S. PATENT DOCUMENTS

| | | | |
|---|---|---|---|
| 4,974,475 A | 12/1990 | Lord et al. | |
| 5,016,501 A * | 5/1991 | Holzer, Jr. | B25B 21/00 173/181 |
| 5,251,706 A | 10/1993 | Evans | |
| 5,967,934 A * | 10/1999 | Ishida | F16H 3/66 475/269 |
| 6,199,642 B1 | 3/2001 | Becker et al. | |
| 6,257,351 B1 | 7/2001 | Ark et al. | |
| 6,273,200 B1 | 8/2001 | Smith et al. | |
| 6,702,090 B2 * | 3/2004 | Nakamura | B25F 5/001 173/217 |
| 6,776,069 B2 * | 8/2004 | Soreo | B25B 21/00 81/54 |
| 6,789,447 B1 | 9/2004 | Zinck | |
| 7,063,201 B2 * | 6/2006 | Nakamura | B25F 5/001 173/217 |
| 7,540,334 B2 | 6/2009 | Gass et al. | |
| 7,673,702 B2 | 3/2010 | Johnson et al. | |
| 7,722,444 B2 * | 5/2010 | Gallagher | B24B 23/022 451/344 |
| 7,926,585 B2 | 4/2011 | Pozgay et al. | |
| 7,963,346 B2 * | 6/2011 | Brodin | B25F 5/001 173/216 |
| 8,075,229 B2 * | 12/2011 | Mok | B23B 31/123 279/62 |
| 8,286,723 B2 * | 10/2012 | Puzio | B25B 23/0064 173/1 |
| 8,303,449 B2 * | 11/2012 | Ho | B23B 45/008 173/176 |
| 2004/0211574 A1 * | 10/2004 | Droste | B25D 16/00 173/29 |
| 2009/0272556 A1 | 11/2009 | Young et al. | |

OTHER PUBLICATIONS

State Intellectual Property Office, First Office Action Concerning CN Application No. 201410024958.4, Oct. 30, 2015, 13 pages (including translation).

State Intellectual Property Office; Second Office Action Concerning CN Application No. 201410024958.4, Jul. 11, 2016.

* cited by examiner

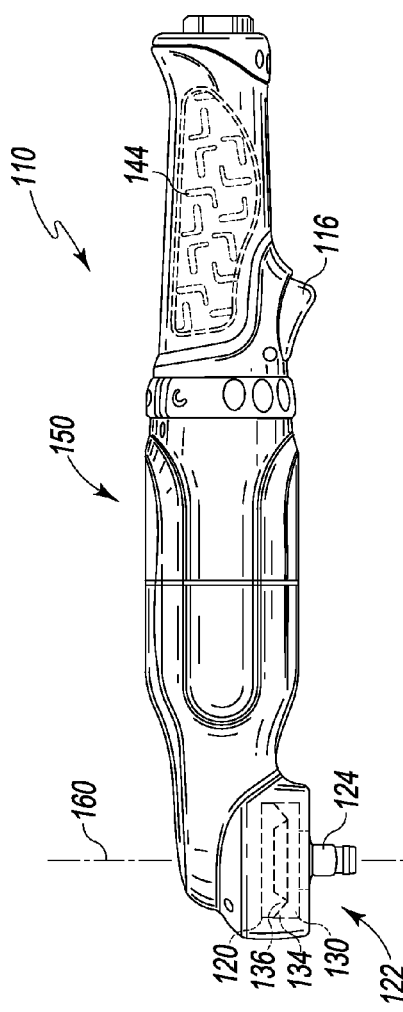
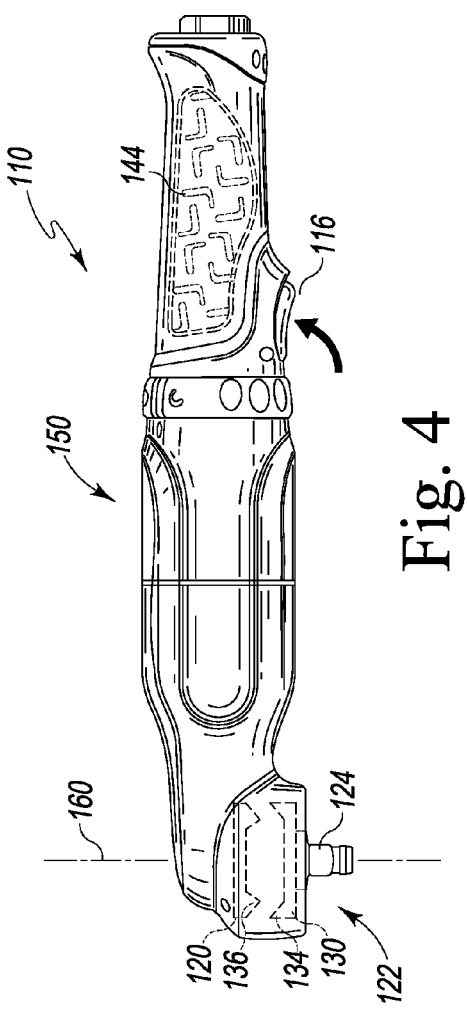

POWER TOOL WITH SPINDLE LOCK

TECHNICAL FIELD

The present disclosure relates, generally, to power tools and, more particularly, to power tools with spindle locks.

BACKGROUND

Power tools, such as screwdrivers and wrenches, by way of example, typically include a spindle designed to support a tool element (e.g., a socket). The spindle (and, hence, the tool element) rotate when driven by a power source of the power tool. In many power tools, the spindle is free to rotate when not being driven by the power source. As such, these power tools do not allow a user to manually apply a load to the spindle of the power tool to, for instance, tighten or loosen a fastener above the capability of the power tool. While some power tools may include a lock for selectively preventing rotation of the spindle, such locks typically require manual engagement and disengagement by a user of the power tool.

SUMMARY

According to one aspect, a power tool may include a drive train including an output assembly, the output assembly including a spindle configured to support a tool element, a power source configured to selectively supply energy to the drive train to cause the output assembly including the spindle to rotate, a switch movable between a first position in which the power source does not supply energy to the drive train and a second position in which the power source supplies energy to the drive train, and a spindle lock configured to automatically engage the output assembly including the spindle when the switch is in the first position and to automatically disengage the output assembly including the spindle when the switch is in the second position, the spindle lock preventing rotation of the output assembly including the spindle when engaged.

In some embodiments, the spindle may be formed to mate with a socket. The power tool may further include an actuator configured to move the spindle lock between a first position in which the spindle lock is engaged with the output assembly and a second position in which the spindle lock is disengaged from the output assembly. The output assembly may include a plurality of teeth arranged around an axis of rotation of the output assembly, and the spindle lock may include one or more teeth configured to mesh with the plurality of teeth of the output assembly when the spindle lock is in the first position to prevent rotation of the output assembly. The power source may be an electric motor, and the actuator may be a solenoid actuator. The power tool may further include a battery configured to selectively supply electric power to the electric motor and to the solenoid actuator when the battery is removably coupled to the power tool. The power source may be a pneumatic motor, and the actuator may be a pneumatic actuator.

In some embodiments, the power tool may further include a housing extending along a longitudinal axis and supporting the power source, the drive train, the output assembly, and the switch of the power tool, where the longitudinal axis is longer than any lateral axis of the housing that is perpendicular to the longitudinal axis. An axis of rotation of the output assembly may be perpendicular to the longitudinal axis of the housing. The switch may be a trigger movable along an axis that is non-parallel to the longitudinal axis of the housing. The trigger may be biased toward the first position in which the power source does not supply energy to the drive train.

According to another aspect, a method of operating a power tool may include receiving a first user input that causes a power source to supply energy to a drive train of the power tool, automatically disengaging a lock from an output assembly of the drive train in response to receiving the first user input, the output assembly including a spindle configured to support a tool element, disengagement of the lock allowing rotation of the output assembly including the spindle, receiving a second user input that causes the power source to cease supplying energy to the drive train of the power tool, and automatically engaging the lock with the output assembly of the drive train in response to receiving the second user input, engagement of the lock preventing rotation of the output assembly including the spindle.

In some embodiments, receiving the first user input may include sensing that a trigger of the power tool has been depressed, and receiving the second user input may include sensing that the trigger of the power tool has been released. Automatically disengaging the lock from the output assembly may include energizing an actuator that moves the lock from a first position in which the lock is engaged with the output assembly to a second position in which the lock is disengaged from the output assembly. Automatically engaging the lock with the output assembly may include ceasing to energize the actuator such that the lock moves from the second position to the first position, the lock being biased toward the first position. Energizing the actuator may include supplying electrical power to a solenoid actuator. Energizing the actuator may include supplying compressed air to a pneumatic actuator.

According to yet another aspect, an impact wrench may include a drive train including a hammer, an anvil, and an output gear, wherein the hammer is configured to impart a torque on the anvil to cause the output gear to rotate when the drive train is energized by a power source, a spindle coupled to the output gear and formed to mate with a socket, and a spindle lock configured to be selectively engaged with the output gear to prevent rotation of the spindle.

In some embodiments, the impact wrench may further include a housing extending along a longitudinal axis and supporting the drive train, wherein the longitudinal axis is longer than any lateral axis of the housing that is perpendicular to the longitudinal axis and wherein an axis of rotation of the spindle is perpendicular to the longitudinal axis. The impact wrench may further include a switch movable between a first position in which the drive train is not energized by the power source and a second position in which the drive train is energized by the power source, wherein the spindle lock is configured to automatically engage the output gear when the switch is in the first position and to automatically disengage the output gear when the switch is in the second position. The output gear may include a plurality of teeth arranged around an axis of rotation of the output gear, and the spindle lock may include one or more teeth configured to mesh with the plurality of teeth of the output gear when the spindle lock is engaged with the output gear to prevent rotation of the spindle.

BRIEF DESCRIPTION

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 3 is a partially-diagrammatic side view of the impact wrench of FIG. 2 with the spindle lock engaged with an output gear of the impact wrench;

FIG. 4 is a partially-diagrammatic side view of the impact wrench of FIGS. 2 and 3 with the spindle lock disengaged from the output gear;

DETAILED DESCRIPTION

While the concepts of the present disclosure are susceptible to various modifications and alternative forms, specific exemplary embodiments thereof have been shown by way of example in the figures and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Figure 1:
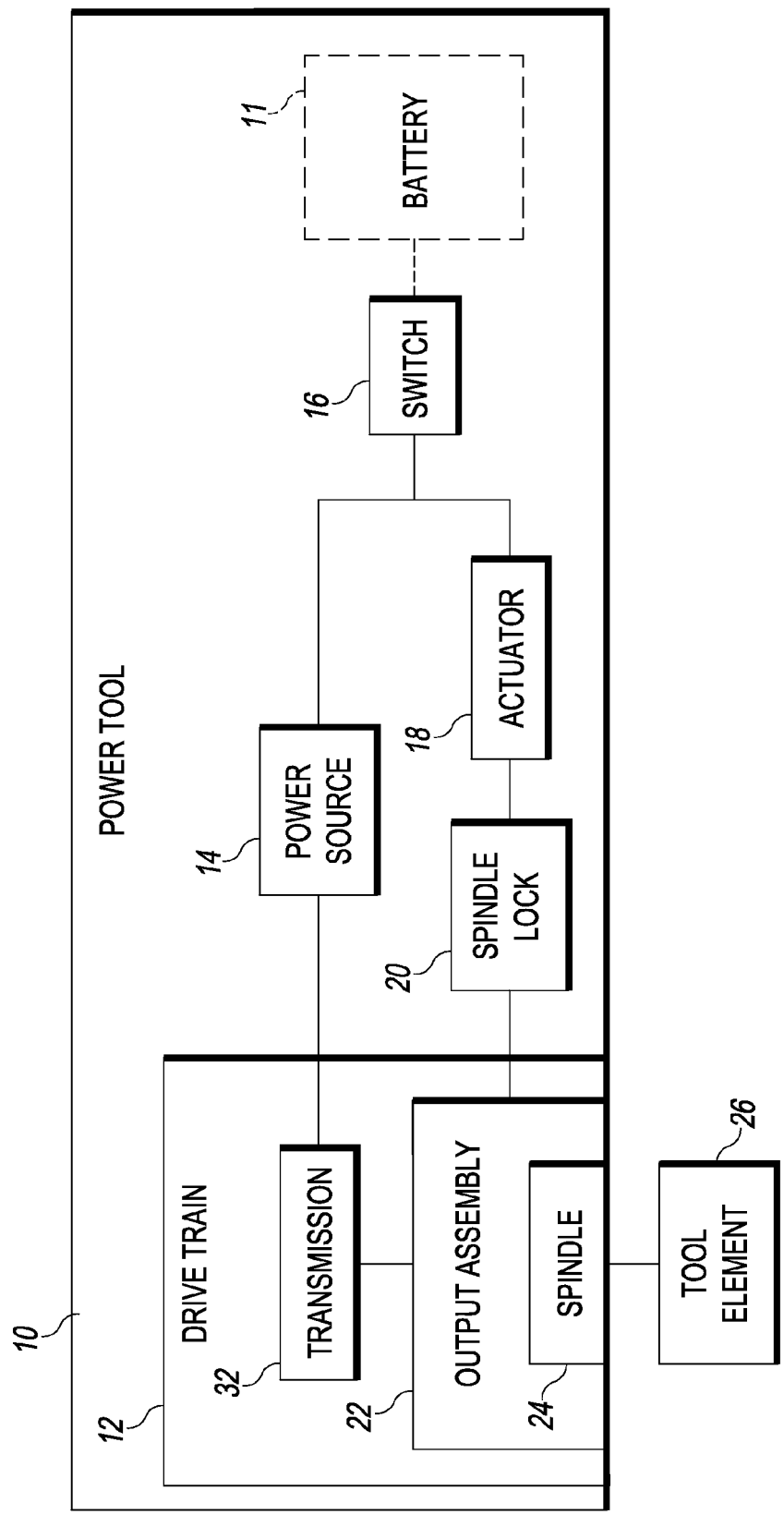
FIG. 1 is a simplified block diagram of at least one illustrative embodiment of a power tool with a spindle lock.

Referring now to FIG. 1, one illustrative embodiment of a power tool 10 is shown as a simplified block diagram. In this illustrative embodiment, the power tool 10 generally includes a drive train 12, a power source 14, a switch 16, an actuator 18, and a spindle lock 20. As shown in FIG. 1, the drive train 12 includes a spindle 24 configured to support (or mate with) a tool element 26. The spindle 24 is configured to rotate when energy is supplied to the drive train 12 from the power source 14. The spindle 24 supports and drives the tool element 26 so that a user may use the power tool 10 to perform work on a work piece (not shown). By way of illustrative example, the power tool 10 may be embodied as a power wrench, the tool element 26 may be embodied as a socket, and the work piece may be embodied as a nut.

The drive train 12 of the power tool 10 may be embodied as any type of device(s) suitable for transferring mechanical energy from the power source 14 to the tool element 26. For instance, in one illustrative embodiment (further described below with reference to FIGS. 2-5), the drive train 12 may include an impact mechanism. In the illustrative embodiment shown in FIG. 1, the drive train 12 includes an output assembly 22 and a transmission 32. During operation of the power tool 10, the transmission 32 transfers energy from the power source 14 to the output assembly 22. The output assembly 22, in turn, transfers energy from the transmission 32 to the tool element 26 via the spindle 24 (which forms part of the output assembly 22). In some embodiments, the output assembly 22 may include an output gear that is either integrally formed with or coupled to the spindle 24 to form the output assembly 22. In such embodiments, the output gear of the output assembly 22 may interface with a corresponding gear of the transmission 32. The spindle 24 may be any type of structure designed to support (or mate with) a tool element 26. In one illustrative embodiment, the spindle 24 may be a shaft with squared edges that is sized to receive standard sockets 26. In another embodiment, the tool element 26 may be a driver bit 26, and the spindle 24 may be a shaft configured to receive and support the driver bit 26. It will be appreciated that the foregoing examples should not be considered limiting.

The power source 14 of the power tool 10 may be embodied as any type of device(s) suitable for converting some form of received energy into mechanical energy that may be supplied to the drive train 12. For example, in some embodiments, the power source 14 may be a pneumatic motor that runs on pressurized pneumatic fluid (e.g., compressed air). In other embodiments, the power source 14 may be an electric motor that runs on electricity. The power source 14 may be supplied with energy from a source that is either internal or external to the power tool 10. For instance, in some embodiments, the power tool 10 may include a battery 11 (as shown in phantom in FIG. 1) to supply electricity to an electric motor 14. In other embodiments, the power source 14 may be connected to an external source of pressurized pneumatic fluid, electricity, or other energy.

The switch 16 of the power tool 10 is disposed between the power source 14 and the energy source for the power tool 10 (e.g., the battery 11). The switch 16 is configured to selectively supply energy to the power source 14, such that the power source 14 selectively supplies mechanical energy to the drive train 12. In other words, the switch 16 is configured to selectively couple the power source 14 to the energy source for the power tool 10. For instance, where the power source 14 is embodied as an electric motor 14, the switch 16 may electrically couple the electric motor 14 to the battery 11 (or an external source of electricity), thereby causing the electric motor 14 to run. In embodiments where the power source 14 is embodied as a pneumatic motor 14, the switch 16 may fluidly couple the pneumatic motor 14 to a source of pressurized pneumatic fluid, thereby causing the pneumatic motor 14 to run. Generally, the switch 16 is movable between at least a first position, in which the power source 14 does not supply energy to the drive train 12, and a second position, in which the power source 14 supplies energy to the drive train 12. The switch 16 may be illustratively embodied as any type of device(s) suitable for controlling operation of the power source 14 in response to user input(s). In some embodiments, for example, the switch 16 may include a trigger, a toggle switch, a slidable switch, and/or a button.

In the illustrative embodiment shown in FIG. 1, the actuator 18 of the power tool 10 is coupled to the spindle lock 20 and is controlled by the switch 16. The actuator 18 is configured to automatically engage the spindle lock 20 with the output assembly 22 when the switch 16 is in the first position. The actuator 18 is also configured to automatically disengage the spindle lock 20 from the output assembly 22 when the switch 16 is in the second position. The actuator 18 may be illustratively embodied as any type of device(s) suitable for engaging and disengaging the spindle lock 20 with the output assembly 22. For instance, where the power source 14 is embodied as an electric motor 14, the actuator 18 may be a solenoid actuator. As such, in some embodiments, the switch 16 may electrically couple the solenoid actuator 18 to the battery 11 (or an external source of electricity), along with the electric motor 14, when the switch 16 is in the second position. In embodiments where the power source 14 is embodied as a pneumatic motor 14, the actuator 18 may be a pneumatic actuator. As such, in some embodiments, the switch 16 may fluidly couple the pneumatic actuator 18 to a source of pressurized pneumatic fluid, along with the pneumatic motor 14, when the switch 16 is in the second position.

The spindle lock 20 of the power tool 10 is selectively engagable with the output assembly 22 to prevent rotation of the output assembly 22 and the spindle 24. The spindle lock 20 may be illustratively embodied as any type of device(s) suitable for selectively preventing rotation of the output assembly 22. For example, in some embodiments, the spindle lock 20 may include a gear that mates with an output gear of the output assembly 22 when engaged. In other embodiments, the spindle lock 20 may include a pin configured to selectively engage a corresponding aperture in the output assembly 22. In the illustrative embodiment of FIG. 1, the spindle lock 20 is moved into and out of engagement with the output assembly 22 by the actuator 18. When the switch 16 is in the first position, the spindle lock 20 engages with and locks the output assembly 22. As such, rotational forces applied to the power tool 10 will be transferred through the spindle 24 (and, hence, the tool element 26). In other words, when the spindle lock 20 is engaged with the output assembly 22, a user may utilize the power tool 10 to manually drive the tool element 26. When the switch 16 is moved to the second position, the spindle lock 20 disengages from the output assembly 22, allowing the output assembly 22 to be driven by the transmission 32 of the drive train 12.

Figure 2:
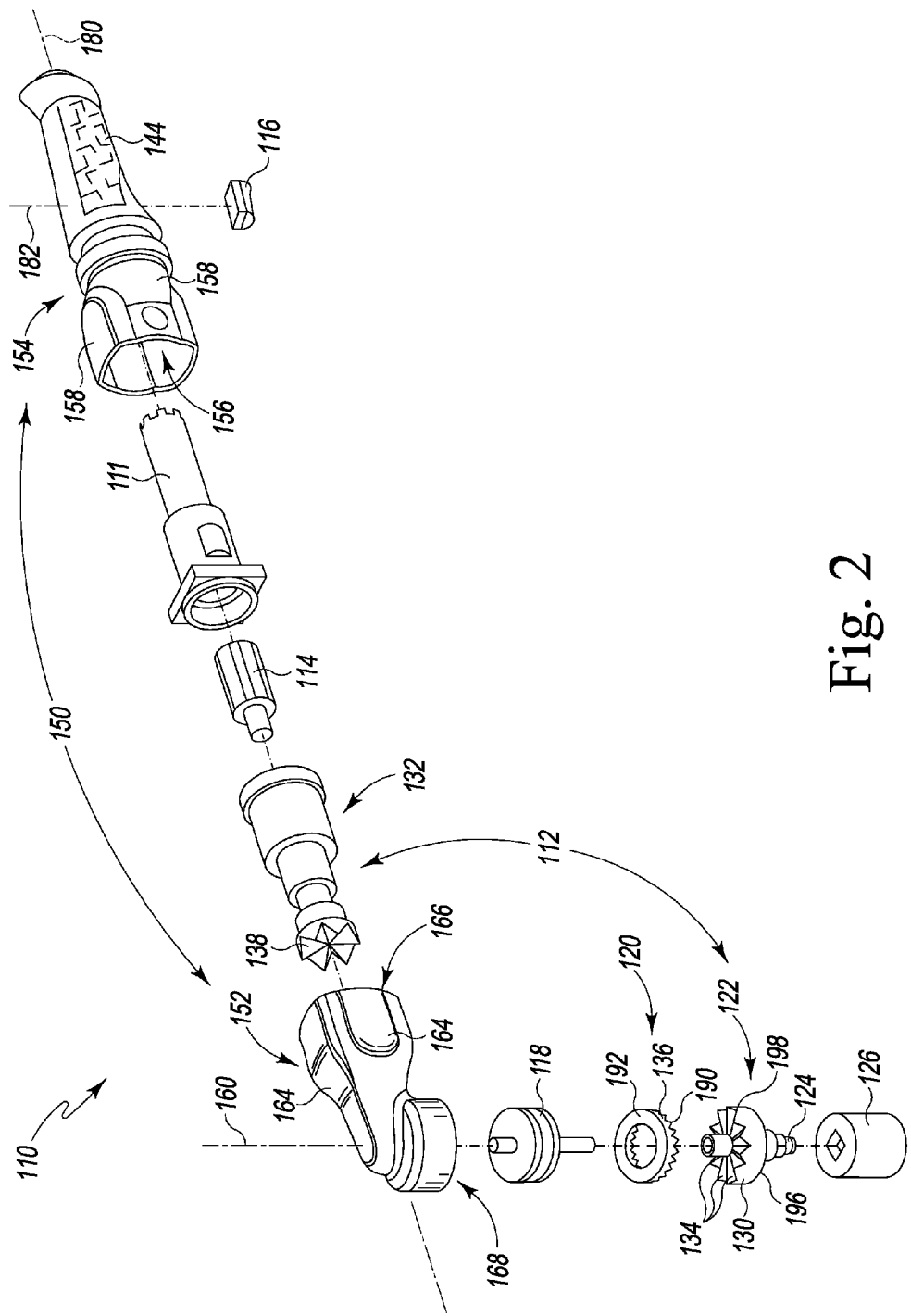
FIG. 2 is a partially exploded view of at least one illustrative embodiment of an impact wrench with a spindle lock.

Referring now to FIGS. 2-5, one illustrative embodiment of the power tool 10 is shown in the form of an impact wrench 110. Generally, features of the impact wrench 110 that may be similar to corresponding features of the power tool 10 of FIG. 1 are described using reference numbers ending in the same two digits. As shown in FIG. 2, the impact wrench 110 generally includes a drive train 112 (comprising a transmission 132 and an output assembly 122 including a spindle 124), an electric motor 114, a trigger switch 116, a solenoid actuator 118, a spindle lock 120, a battery 111, and a housing 150.

The housing 150 of the impact wrench 110 is configured to support the various components of the impact wrench 110. The housing 150 may be formed from, by way of example, plastic, metal, and/or any other suitable material(s). The housing 150 extends along a longitudinal axis 180. This longitudinal axis 180 of the housing 150 is longer than any lateral axis of the housing 150 that is perpendicular to the longitudinal axis 180. In other words, the housing 150 of the impact wrench 110 has an elongated shape.

The housing 150 may include any number of constituent parts. For example, in the illustrative embodiment of FIGS. 2-5, the housing 150 comprises both a spindle housing 152 and a body housing 154, which together form the housing 150. The body housing 154 includes a number of side walls 158, which are arranged generally radially around the longitudinal axis 180 and which cooperate to form a handle 144 and an aperture 156 that opens into the interior of the body housing 154. The spindle housing 152 includes a number of side walls 164, which are also arranged generally radially around the longitudinal axis 180 and which cooperate to form apertures 166, 168 that both open into the interior of the spindle housing 152. The aperture 166 formed in the spindle housing 152 is aligned with the aperture 156 in the body housing 154 (along the longitudinal axis 180), while the aperture 168 in the spindle housing 152 is arranged around a rotation axis 160 that is generally perpendicular to the longitudinal axis 180. As illustrated in FIG. 2, the spindle housing 152 is formed to mate with the body housing 154 in coaxial relation along the longitudinal axis 180 to form the housing 150 (such that the aperture 156 is closed by spindle housing 152 and the aperture 166 is closed by body housing 154).

In the illustrative embodiment of the impact wrench 110, the transmission 132 of the drive train 112 includes an impact mechanism 1104 that converts the torque of the electric motor 114 into a series of powerful rotary blows directed from a hammer 1114 to an anvil 1116, as described below in greater detail with reference to FIGS. 7 and 8. The impact mechanism 1104 is substantially identical to the impact mechanism described in U.S. Pat. No. 7,673,702 to Johnson et al., the entire disclosure of which is hereby incorporated by reference. The hammer 1114 of the impact mechanism 1104 may be configured to impart a torque on the anvil 1116 to cause a gear 138 to rotate when the drive train 112 is energized by the electric motor 114.

As shown in FIGS. 2-5, the output assembly 122 of the impact wrench 110 is configured to rotate about the rotation axis 160 that is generally perpendicular to the longitudinal axis 180 (and passes through the aperture 168 of the spindle housing 152). It is contemplated that, in other embodiments, the rotation axis 160 of the output assembly 122 may have other orientations relative to the longitudinal axis 180. In some embodiments, the direction of rotation of the output assembly 122 about the rotation axis 160 may be selectively reversed (e.g., by running the electric motor 114 in opposite directions). When the output assembly 122 rotates about the rotation axis 160, the spindle 124 (which forms part of the output assembly 122) also rotates and causes a socket 126 supported on the spindle 124 to rotate about the rotation axis 160.

In addition to the spindle 124, the output assembly 122 includes an output gear 130 that interfaces with the gear 138 of the transmission 132. As described above, the output gear 130 may be either integrally formed with or coupled to the spindle 124 to form the output assembly 22. In the illustrative embodiment, the output gear 130 includes a lower face 196, an upper face 198 opposite the lower face 196, and a plurality of teeth 134 extending from the upper face 198 (i.e., away from the lower face 196). As shown in FIG. 2, the plurality of teeth 134 are arranged around the rotation axis 160. The lower face 196 may be substantially flat and generally flush with spindle housing 152 when the output assembly 122 is positioned in the spindle housing 152. As such, the spindle 124 extends at least partially out of the aperture 168 of the spindle housing 152. As shown in FIG. 2, the spindle 124 is illustratively embodied as a squared shaft that is configured to receive a socket 126 having a squared indentation or aperture formed therein.

In the illustrative embodiment of the impact wrench 110, the spindle lock 120 has an annular shape and includes an upper face 192, a lower face 190 opposite the upper face 192, and one or more teeth 136 extending from the lower face 190 (i.e., away from the upper face 192). The one or more teeth 136 of the spindle lock 120 are formed to mate with the plurality of teeth 134 of the output gear 130 when the spindle lock 120 is engaged with the output assembly 122. The spindle lock 120 is coupled to the solenoid actuator 118 of the impact wrench 110. The solenoid actuator 118 is configured to move the spindle lock 120 along the rotation axis 160 in response to the solenoid actuator 118 being connected or disconnected to the battery 111 (by the trigger switch 116). As such, the spindle lock 120 is moved into and out of engagement with the output gear 130 of the output assembly 122 by the solenoid actuator 118.

The trigger switch 116 of the impact wrench 110 is positioned in the body housing 154, at or near the handle 144. In the illustrative embodiment shown in FIG. 2, the trigger switch 116 is movable along a trigger axis 182 that is non-parallel to the longitudinal axis 180 (e.g., perpendicular to the longitudinal axis 180). The trigger switch 116 is movable between a released position, in which the electric motor 114 does not supply energy to the drive train 112, and a depressed position, in which the electric motor 114 supplies energy to the drive train 112. The trigger switch 116 may be biased toward the released position (e.g., by a spring or other resilient member), such that the trigger switch 116 is moved to or maintained in the released position in the absence of force being applied to the trigger switch 116. When force is applied to the trigger switch 116 (e.g., by a user), the trigger switch 116 may move along the trigger axis 182 toward a depressed position.

Referring now to FIGS. 3 and 4, various partially-diagrammatic side views of the impact wrench 110 are shown to illustrate the interaction of the spindle lock 120 with the output gear 130 (of the output assembly 122) in response to the position of the trigger switch 116. As illustrated in FIG. 3, when trigger switch 116 is in the released position (in which the electric motor 114 does not supply energy to the drive train 112), the spindle lock 120 is automatically engaged with the output gear 130 to prevent rotation of the output assembly 122 (including the spindle 124). In the illustrative embodiment, both the electric motor 114 and the solenoid actuator 118 are disconnected from the battery 111 when the trigger switch 116 is in the released position. In this embodiment, the solenoid actuator 118 is biased toward the output assembly 122 in the absence of power, such that the spindle lock 120 is moved along the rotation axis 160 into engagement with the output gear 130. In particular, the one or more teeth 136 of the spindle lock 120 mate with the plurality of teeth 134 of the output gear 130 to prevent rotation of the output assembly 122 (including the spindle 124).

As illustrated in FIG. 4, when trigger switch 116 is moved into the depressed position (in which the electric motor 114 supplies energy to the drive train 112), the spindle lock 120 is automatically disengaged from the output gear 130 to allow rotation of the output assembly 122 (including the spindle 124). In the illustrative embodiment, both the electric motor 114 and the solenoid actuator 118 are connected to the battery 111 when the trigger switch 116 is in the depressed position. In this embodiment, when the solenoid actuator 118 is supplied with power, the solenoid actuator 118 moves the spindle lock 120 along the rotation axis 160 and out of engagement with the output gear 130. As such, the output assembly 122 (including the output gear 130 and the spindle 124) are free to rotate about the rotation axis 160 when driven by the electric motor 114.

Figure 5:
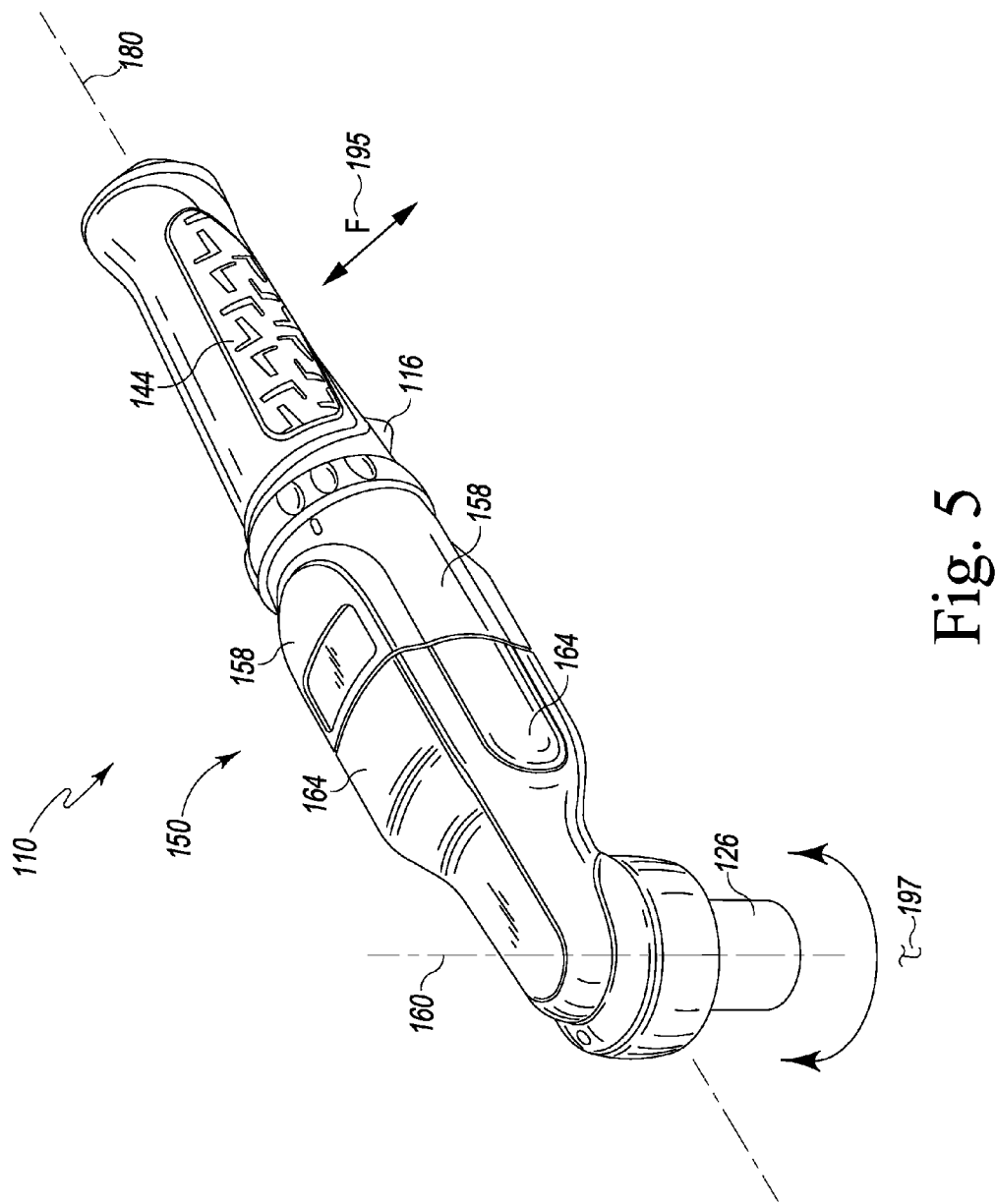
FIG. 5 is a perspective view of the impact wrench of FIGS. 2-4 illustrating the conversion of a force applied to a handle of the impact wrench into a torque at a spindle of the impact wrench.

Thus, when the trigger switch 116 of the impact wrench 110 is in the released position, a force 195 applied to the handle 144 of the impact wrench 110 may be converted into a torque 197 at the spindle 124 of the impact wrench 110, as illustrated in FIG. 5. As the spindle lock 120 automatically engages the output assembly 122 of the impact wrench 110 when a user releases the trigger switch 116, the user may then apply force 195 (e.g., spaced apart from and generally orthogonal to the rotation axis 160, as shown in FIG. 5) to create torque 197 at the socket 126 mated with the spindle 124. In this way, the user may manually impart a greater torque 197 to the socket 126 than can be achieved using the electric motor 114 and drive train 112 of the impact wrench 110. It will be appreciated that, in this illustrative embodiment, a user need not manually engage and disengage the spindle lock 120 to convert the impact wrench 110 between non-powered and powered operation.

Figure 6:
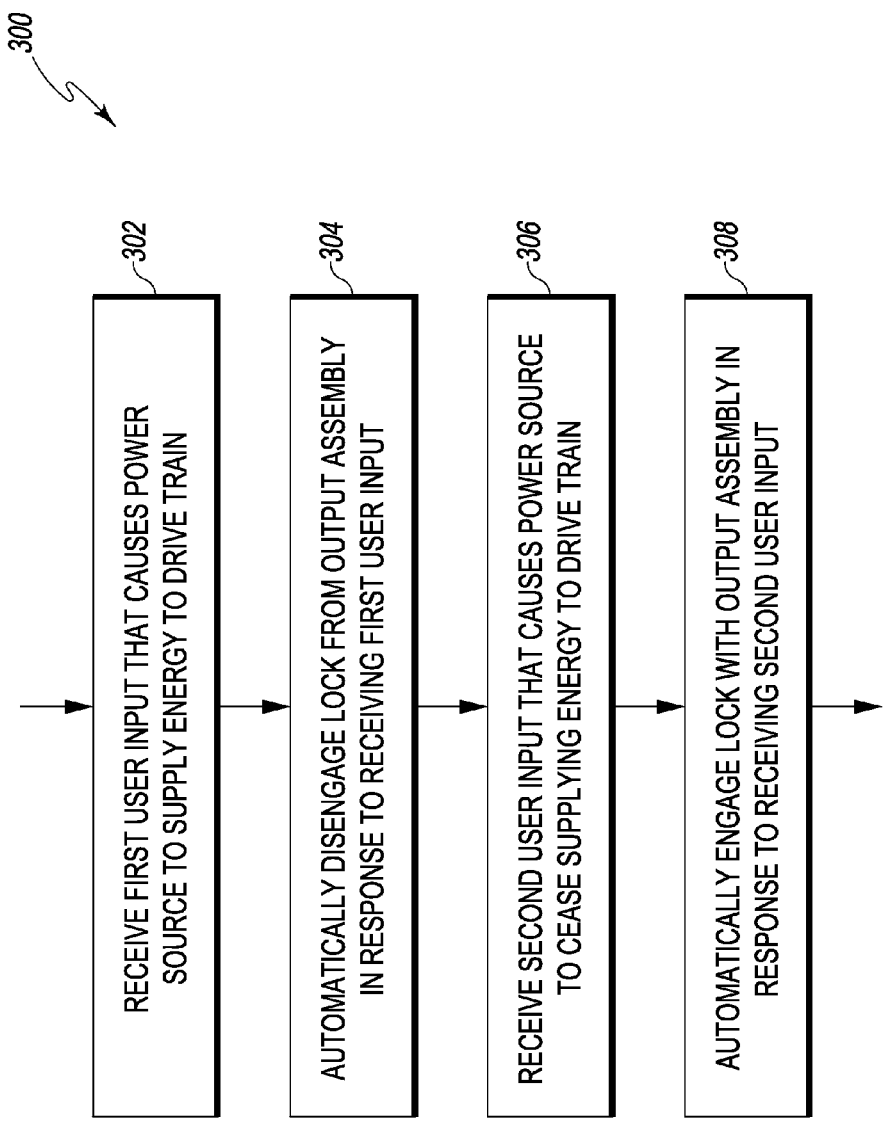
FIG. 6 is a simplified flow chart of at least one illustrative embodiment of a method of operating the power tool of FIG. 1.

Referring now to FIG. 6, one illustrative embodiment of a method 300 of operating a power tool 10 (e.g., the impact wrench 110) is shown as a simplified flow diagram. Although the method 300 is described below with reference to the power tool 10 of FIG. 1, the method 300 is equally applicable to the impact wrench of FIGS. 2-5, as well as other embodiments of power tools with spindle locks. The method 300 is illustrated in FIG. 6 as a number of blocks 302-308.

The method 300 begins with block 302 in which the power tool 10 receives a first user input that causes the power source 14 to supply energy to the drive train 12. As described above, the power tool 10 may receive the first user input through the switch 16. In some embodiments of the method 300, block 302 may include sensing that the switch 16 (e.g., the trigger switch 116 of the impact wrench 110) has been depressed by a user. In other embodiments, other types of switches 16 may receive any suitable form of user input during the block 302. In the illustrative embodiment, when the first user input is received in block 302, the switch 16 connects the power source 14 to an energy source of the power tool 10 such that the power source 14 supplies energy to the drive train 12.

After block 302, the method 300 proceeds to block 304 in which the power tool 10 automatically disengages the spindle lock 20 from the output assembly 22 in response to receiving the first user input. In some embodiments of the method 300, block 304 may involve energizing the actuator 18 to move the spindle lock 20 from a position in which the spindle lock 20 is engaged with the output assembly 22 to a position in which the spindle lock 20 is disengaged from the output assembly 22. For instance, where the power tool 10 includes an electric motor 14, block 304 may involve supplying electrical power to a solenoid actuator 18 of the power tool 10. Alternatively, where the power tool 10 includes a pneumatic motor 14, block 304 may involve supplying compressed air to a pneumatic actuator 18 of the power tool 10. In either case, the switch 16 may connect the actuator 18 to an energy source of the power tool 10 when the first user input is received in block 302. Disengagement of the spindle lock 20 from the output assembly 22 in block 304 allows the power source 14 to drive rotation of the output assembly 22 including the spindle 24.

After block 304, the method 300 proceeds to block 306 in which the power tool 10 receives a second user input that causes the power source 14 to cease supplying energy to the drive train 12. As described above, the power tool 10 may also receive the second user input through the switch 16. In some embodiments of the method 300, block 306 may include sensing that the switch 16 (e.g., the trigger switch 116 of the impact wrench 110) has been released by the user. In other embodiments, other types of switches 16 may receive any suitable form of user input during the block 306. In the illustrative embodiment, when the second user input is received in block 306, the switch 16 disconnects the power source 14 from the energy source of the power tool 10 such that the power source 14 does not supply energy to the drive train 12.

After block 306, the method 300 proceeds to block 308 in which the power tool 10 automatically engages the spindle lock 20 with the output assembly 22 in response to receiving the second user input. In some embodiments of the method 300, block 308 may involve ceasing to energize the actuator 18 such that the spindle lock 20 moves from the position in which the spindle lock 20 is disengaged from the output assembly 22 to the position in which the spindle lock 20 is engaged with the output assembly 22. In such embodiments, the switch 16 may disconnect the actuator 18 from the energy source of the power tool 10 when the second user input is received in block 308. The spindle lock 20 may be biased toward engagement with the output assembly 22, such that disconnecting the actuator 18 from the energy source of the power tool 10 causes the spindle lock 20 to engage the output assembly 22. After the spindle lock 20 engages the output assembly 22 in block 308, the spindle lock 20 will prevent rotation of the output assembly 22 including the spindle 24, thereby allowing a user to manually tighten or loosen a fastener using the power tool 10, as described above.

Figure 7:
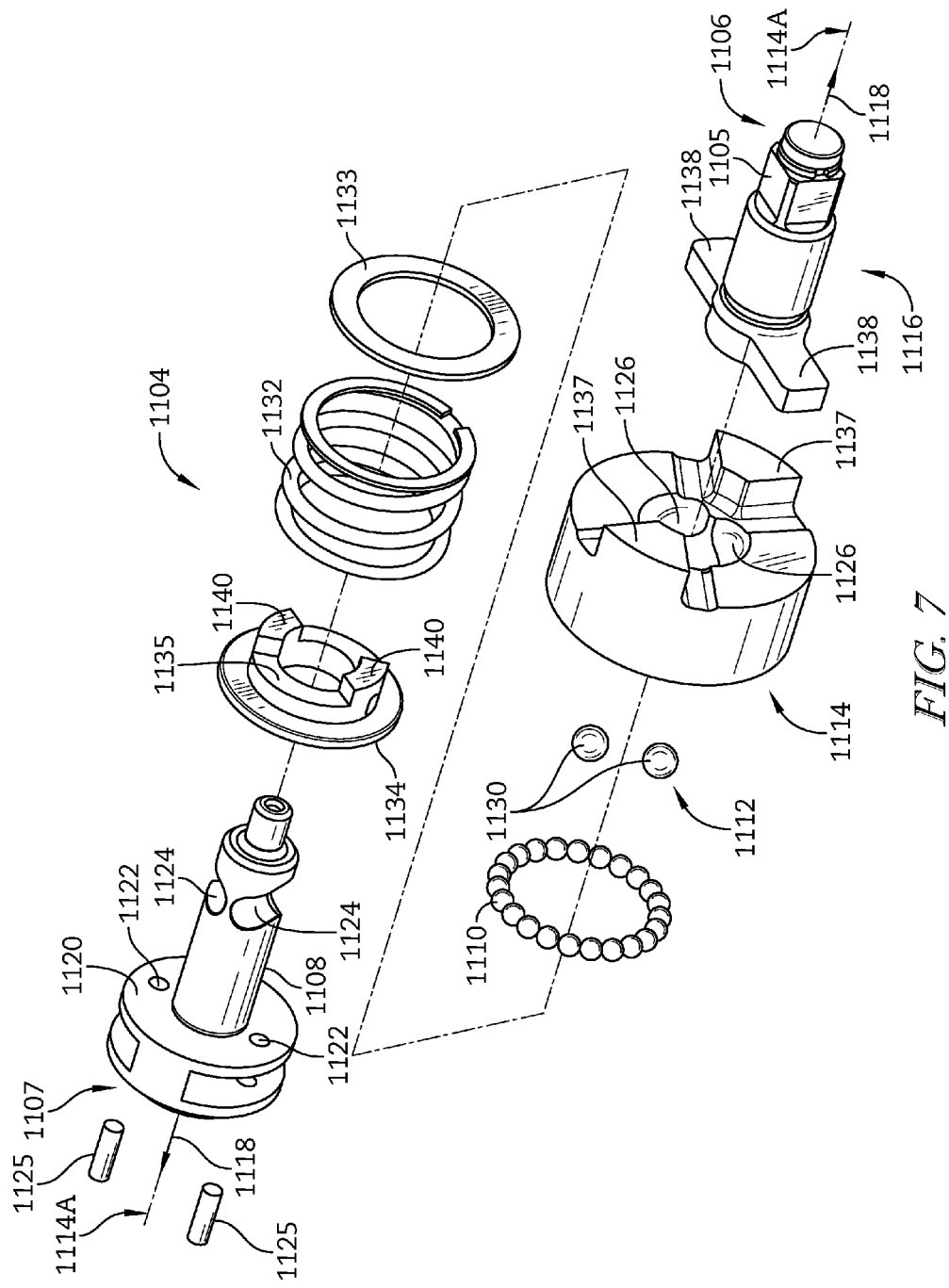
FIG. 7 is an exploded perspective view of an impact mechanism of the impact wrench of FIG. 2.
Figure 8:
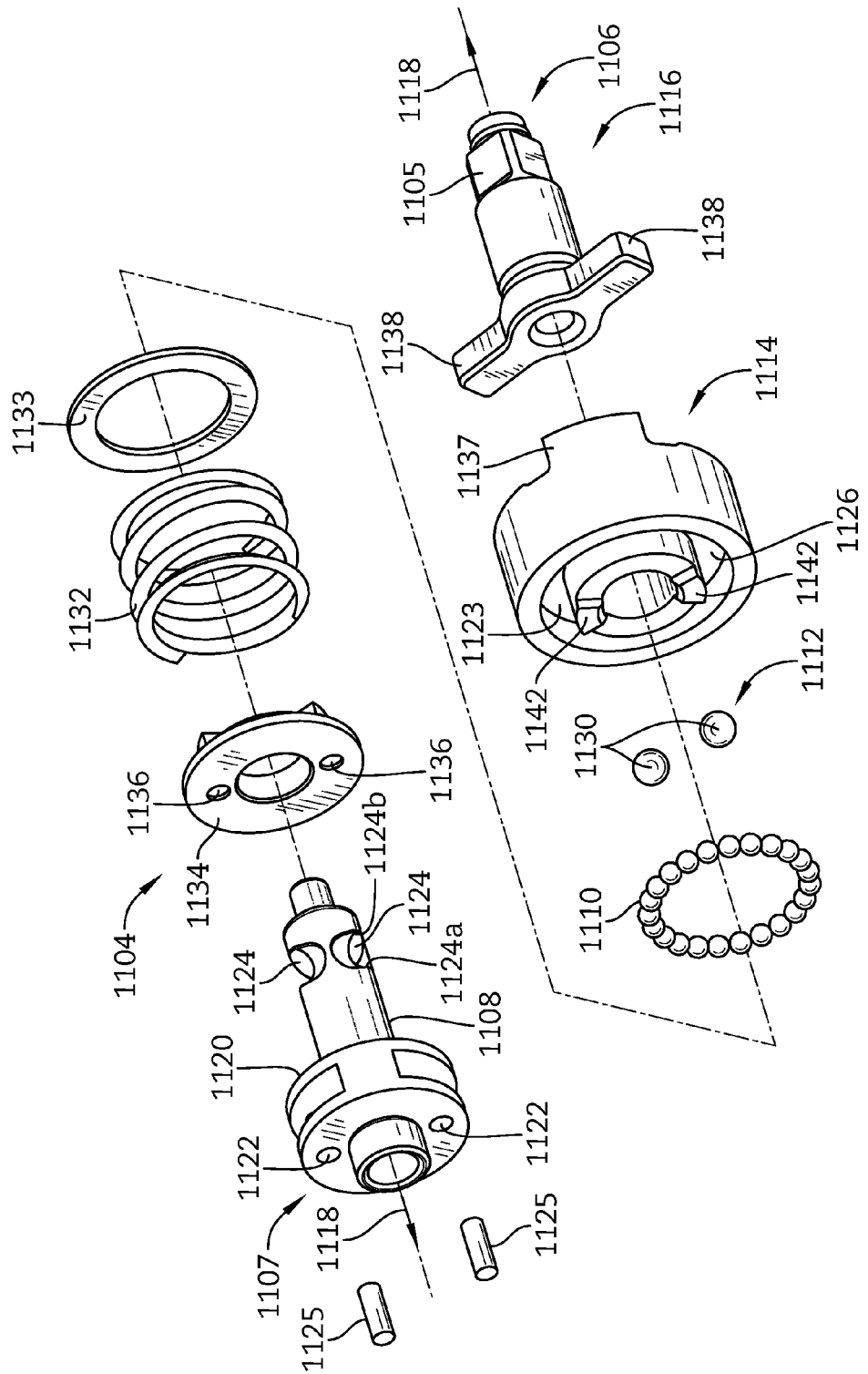
FIG. 8 is another exploded perspective view of the impact mechanism of the impact wrench of FIG. 2.

FIGS. 7 and 8 illustrates the impact mechanism 1104 included in the impact wrench 110. The impact mechanism 1104 includes a cam shaft 1108, a bearing 1110, an impact bearing 1112, the hammer 1114 and the anvil 1116. The cam shaft 1108 is driven for rotation about a longitudinal axis 1118 by the motor 114. The cam shaft 1108 includes a planetary gear carrier 1120 for coupling to the motor 114. Gear pin holes 1122 extend through the planetary gear carrier 1120 and receive pins 1125 for coupling to the motor 114. The cam shaft 1108 is coupled to the hammer 1114 through the impact bearing 1112. The hammer 1114 includes an annular recess 1123 for receiving the bearing 1110. The hammer 1114 is rotatable over the bearing 1110 and in turn drives rotation of the anvil 1116 about the longitudinal axis 1118. The anvil 1116 is integrally formed with the output spindle 1105.

The cam shaft 1108 and the hammer 1114 each include a pair of opposed helical grooves 1124 and 1126, respectively. The hammer grooves 1126 have open ends facing the anvil 1116 for ease of machining and assembly. Thus, the cam shaft groove 1124 is partially defined by a forward facing wall 1124a and a rearward facing wall 1124b, while the hammer groove 1126 is partially defined by a forward facing wall 1126a and lacks a rearward facing wall. A pair of balls 1130 forming the impact bearing 1112 couple the cam shaft 1108 to the hammer 1114. Each ball 1130 is received in a race formed by the hammer groove 1126 and the corresponding cam shaft groove 1124.

A spring member 1132 and a washer 1133 are disposed in between the planetary gear carrier 1120 and the hammer 1114 to bias the hammer 1114 away from the planetary gear carrier 1120. The washer 1133 and an end portion of the spring member 1132 are received within the hammer annular recess 1123 and abut the bearing 1110.

A spring retainer 1134 is located in between the planetary gear carrier 1120 and the spring member 1132 and includes an annular flange 1135 for aligning the spring member 1132. The spring retainer 1134 includes blind holes 1136 for receiving the pins 1125 extending through the planetary groove carrier 1120 and for aligning the spring retainer 1134 to the planetary gear carrier 1120. The cam shaft grooves 1124 (see below) in turn are formed in the cam shaft 1108 in alignment with the planetary gear carrier 1120 so that the spring retainer 1134 is aligned to the cam shaft grooves 1124.

A forward-facing end of the hammer 1114 includes a pair of lugs or ears 1137 for driving rotation of the anvil 1116. The anvil 1116 likewise includes a pair of lugs or ears 1138 for cooperating with the hammer lugs 137.

To assemble the impact mechanism 1104, the spring retainer 1134, the spring member 1132 and the washer 1133 are inserted over the cam shaft 1108. The bearing 1110 is placed within the annular recess 1123 and the hammer 1114 is inserted over the cam shaft 1108 to receive the washer 1133 and the end portion of the spring member 1132 within the annular recess 1123. Next, the hammer 1114 is moved towards the spring retainer 1134 against the force of the spring member 1132. As the hammer 1114 moves axially towards the spring retainer 1134, there is a clearance between the cam shaft 1108 and the hammer 1114 at the hammer grooves 1126 so that the cam shaft groove 1124 is exposed. This clearance is provided by the open end of the hammer grooves 1126, and is slightly greater than a diameter of the balls 1130. One ball 1130 is inserted into each of the cam shaft grooves 124 and the hammer 1114 is released. The biasing force of the spring member 1132 forces the hammer 1114 away from the spring retainer 1134. The forward-facing wall 1126a of the hammer groove 1126 presses against a rearward portion of the balls 1130. This presses a forward portion of the balls 1130 against the rearward-facing surface 1124b of the cam shaft groove 1124. The balls 1130 are thereby trapped between the cam shaft 1108 and the hammer 1114, and couple the hammer 1114 to the cam shaft 1108. The cam shaft groove 1124 need not be aligned with the hammer groove 1126 to permit installation; rather, as the hammer 1114 moves away from the cam shaft 1108 when released, the hammer 1114 rotates slightly over the balls 1130 to align the hammer groove 1126 with the cam shaft groove 1124 in a neutral position.

The impact mechanism 1104 further includes an axial stop for limiting axial displacement of the hammer 1114 towards the rear end 1107. The axial stop includes a first pair of stop members 1140 on the spring retainer 1134 facing the hammer 1114 and a pair of corresponding second stop members 1142 on the hammer 1114 facing the spring retainer 1134. In the illustrated embodiment, the stop members 1140, 1142 are bosses. In other embodiments (not shown), the stop members 1140, 1142 may have different shapes, and may be shaped differently from one another.

The first stop members 1140 are aligned with the helical grooves 1124 as well as the gear pin holes 1122 on the planetary gear carrier 1120. The second stop members 1142 are likewise aligned with the helical grooves 1126. The first stop members 1140 are aligned with the second stop members 1142 about the axis 1118 when the impact mechanism 1104 is not in use (i.e., when in the neutral position).

In operation, the motor 114 drives rotation of the cam shaft 1108 about the longitudinal axis 1118. During nut rundown, (i.e., when rotation of the anvil 1116 is not significantly opposed), the hammer 1114 rotates with the cam shaft 1108 over the bearing 1110. Rotational torque is transferred from the cam shaft 1108 to the hammer 1114 through the impact bearing 1112. The hammer lugs 1137 cooperate with the anvil lugs 1138 to drive rotation of the anvil 1116 and thereby the output spindle 1105.

When the nut tightens, the hammer 1114 begins to rotate more slowly than the cam shaft 1108. The rotation of the cam shaft 1108 relative to the hammer 1114 causes the balls 1130 to roll along the grooves 1124, 1126 so that the hammer 1114 pulls to the rear end 1107 against the force of the spring member 1132. The hammer 1114 thus backs up the helical grooves 1124 over the balls 1130 away from the anvil 1116. The balls 1130 likewise travel along the grooves 1124, 1126 and remain trapped between the forward facing wall 1126a and the rearward facing wall 1124b. The hammer lugs 1137 are thus lifted over the anvil lugs 1138, which permits the hammer 1114 to rotate unimpeded relative to the anvil 1116 one-half of a revolution. As the hammer 1114 rotates, the hammer 1114 travels back down the helical grooves 1124 towards the anvil 1116 under the force of the spring member 1132. The hammer 1114 is thrust forward in time for engagement with the anvil lugs 1138 at impact.

During normal operation, the hammer 1114 moves along a first travel path that includes a helical rotation about the cam shaft 1108. By helical rotation, it is meant that the first travel path both rotates about the cam shaft 1108 and travels axially along the cam shaft 1108. The axial stop does not interfere with axial travel of the hammer 1114 while on the first travel path. This is because as the hammer 1114 rotates relative to the spring retainer 1134, the second stop members 1142 become non-aligned with or circumferentially displaced from the first stop members 1140. This non-alignment allows the hammer 1114 to move towards the spring retainer 1134 without the second stop members 1142 encountering the first stop members 1140.

If the impact wrench 110 were dropped or struck on an end and in particular the rear end 1107, the blow to the cam shaft 1108 causes the hammer 1114 to move against the force of the spring member 1132 toward the spring retainer 1134 along a second travel path that includes axial travel, but does not rotate. As the hammer groove 1126 slides past the cam shaft groove 1124, the cam shaft groove 1124 is partially exposed and clearance between the rearward facing wall 1124b of the cam shaft groove 1124 and the forward facing wall 1126a of the hammer groove 126 approaches the diameter of the balls 130. This approximates the configuration of the impact mechanism 1104 during assembly when the hammer 1114 is slid rearwardly to expose the cam shaft grooves 1124 for insertion of the balls 1130. Because the hammer 1114 is not rotating, however, the second stop members 1142 and the first stop members 1140 remain aligned with one another as they are aligned with one another in the neutral position. As the hammer 1114 approaches the spring retainer 1134, the second stop members 1142 encounter the first stop members 1140, inhibiting further travel of the hammer 1114 in an axial direction to the rear end 1107. In particular, the hammer 1114 is inhibited from moving rearwardly a sufficient distance as would permit the balls 1130 to escape the exposed cam shaft groove 1124.

The axial stop thus inhibits axial travel of the hammer 1114 towards the rear end 1107 when the hammer 1114 is not rotating (i.e., when the hammer 1114 is in a neutral position aligned with cam shaft 1134). This feature prevents the balls 1130 from escaping the grooves 1124, 1126 if the impact wrench 110 is dropped or struck on an end. The axial stop does not, however, inhibit axial travel when the hammer 1114 is rotating (i.e., during normal operating conditions). Furthermore, the axial stop does not inhibit axial travel of the hammer 1114 when the hammer is intentionally rotated relative to the cam shaft 1108 as during assembly. This feature permits the hammer groove 1126 to be machined with an open end, thus reducing the complexity of machining and providing for a simpler assembly process, while preventing the balls 1130 from escaping the grooves 1124, 1126 through accident or misuse of the impact wrench 110.

In the illustrated embodiment, two first stop members 1140 and two second stop members 1142 are provided opposite one another. In other embodiments, more or fewer stop members are provided. The height of the stop members 1140, 1142 can be selected to determine the distance of non-rotational axial travel permitted. In the illustrated embodiment, the stop members 1140, 1142 have the same height. In other embodiments (not shown), the height of the stop members 1140 is different from the height of the stop members 142.

In the illustrated embodiment, the first stop members 1140 are provided on the spring retainer 1134, which is separate from the cam shaft 1108. In other embodiments (not shown), the spring retainer 1134 and the first stop members 1140 are provided directly on the cam shaft 1108.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A power tool with a spindle lock assembly comprising:
an output assembly that includes a spindle configured to support a tool element;
wherein the spindle is rotatable about a spindle axis;
a power source;
an electric motor that rotates about a motor axis when supplied with energy from the power source;
wherein the motor axis is perpendicular to the spindle axis;
a solenoid actuator movable along the spindle axis perpendicular to the motor axis;
wherein both the solenoid actuator and the electric motor are electrically connectible and disconnectible from the power source;
a switch movable between a released position in which the power source does not supply energy to the electric motor and the solenoid actuator, and a depressed position in which the power source supplies energy to the electric motor and the solenoid actuator;
a spindle lock that is operable along the spindle axis perpendicular to the motor axis,
wherein the spindle lock includes an upper face, a lower face opposite the upper face, and one or more teeth extending from the lower face away from the upper face; and
an output gear coupled to the spindle;
wherein the output gear includes a plurality of teeth;
wherein the spindle lock is coupled to the solenoid actuator which is configured to move the spindle lock along the spindle axis in response to the solenoid actuator being connected or disconnected to the to the power source which selectively moves the spindle lock into and out of engagement with the output gear of the output assembly;
wherein when the switch is moved to the released position, the power source does not supply energy to both the electric motor and the solenoid actuator which causes the solenoid actuator to bias toward the output assembly such that the spindle lock is moved along the spindle axis perpendicular to the motor axis and into engagement with the output gear of the spindle lock by the one or more teeth of the spindle lock that mate with the plurality of teeth of the output gear which prevents rotation of the spindle; and wherein when the switch is moved into the depressed position, the power source supplies power to the electric motor and the solenoid actuator which causes the spindle lock to disengage from the output gear to allow rotation of the spindle about the spindle axis.

2. The power tool of claim 1, wherein the spindle is formed to mate with a socket.

3. The power tool of claim 1, further comprising a housing extending along a longitudinal axis over a first maximum distance and supporting the power source, electric motor, the output assembly, and the switch of the power tool, the first maximum distance being longer than a second maximum distance over which the housing extends along a lateral axis that is perpendicular to the longitudinal axis.

4. The power tool of claim 3, wherein the switch is a trigger movable along an axis that is non-parallel to the longitudinal axis of the housing.

* * * * *